United States Patent
Tsukada et al.

[11] Patent Number: 5,617,938
[45] Date of Patent: Apr. 8, 1997

[54] FRICTION CLUTCH

[75] Inventors: Yoshiaki Tsukada; Kazuhiko Nakamura; Mitsuru Saito; Hiroaki Kayama, all of Saitama, Japan

[73] Assignee: Honda Giken Kogyo Kabushiki Kaisha, Tokyo, Japan

[21] Appl. No.: 462,883

[22] Filed: Jun. 5, 1995

[30] Foreign Application Priority Data

Sep. 29, 1994 [JP] Japan ................................. 6-258996

[51] Int. Cl.$^6$ ............................ F16D 13/56; F16D 43/286
[52] U.S. Cl. ................ 192/54.5; 192/55.61; 192/70.23; 192/89.22
[58] Field of Search ................................. 192/54.5, 55.6, 192/55.61, 70.23, 89.21, 89.22, 89.26, 70.27

[56] References Cited

U.S. PATENT DOCUMENTS

| | | | |
|---|---|---|---|
| 1,207,190 | 12/1916 | Mack | 192/70.27 X |
| 1,559,527 | 10/1925 | Spase | 192/70.23 |
| 4,613,026 | 9/1986 | Ohzono et al. | 192/89.21 X |
| 5,496,154 | 3/1996 | Hall et al. | 192/89.21 X |

FOREIGN PATENT DOCUMENTS

| | | | |
|---|---|---|---|
| 59-219525 | 12/1984 | Japan . | |
| 62-72927A | 3/1987 | Japan . | |
| 1-238720 | 9/1989 | Japan | 192/89.22 |
| 5-73928 | 10/1993 | Japan . | |

*Primary Examiner*—Rodney H. Bonck

[57] ABSTRACT

A friction clutch wherein the distance between a clutch center member on a driven shaft side and a pressure plate, between which an alternate arrangement of clutch friction plates on a driving shaft side and clutch plates on the driven shaft side is disposed, is increased or decreased to disconnect or connect transmission of power between the driving shaft side and the driven shaft side. The driven shaft is constructed so that the clutch center member and the pressure plate are disposed for relative displacement in a direction of rotation. The friction clutch includes a conversion mechanism for converting a relative displacement in the direction of rotation caused by a countertorque inputted to the friction clutch into a relative displacement in a direction of an axis of rotation to increase the distance between the clutch center member and the pressure plate.

20 Claims, 6 Drawing Sheets

FRICTION CLUTCH

BACKGROUND OF THE INVENTION

1. Field of the Invention

This invention relates to a multiple disk friction clutch, and more particularly to a friction clutch which includes a countertorque limiter mechanism for preventing a countertorque from a driven shaft side from excessively rotating a driving shaft.

2. Description of Background Art

Various examples have conventionally been proposed which include a countertorque limiter mechanism which moves, when a countertorque is inputted, a pressure plate in a direction away from a clutch center member to weaken the frictional engagement of the friction clutch. Examples of this are disclosed in Japanese Patent Publication No. Hei 5-73928 and Japanese Patent Laid-Open No. Sho 59-219525.

Figure 8:
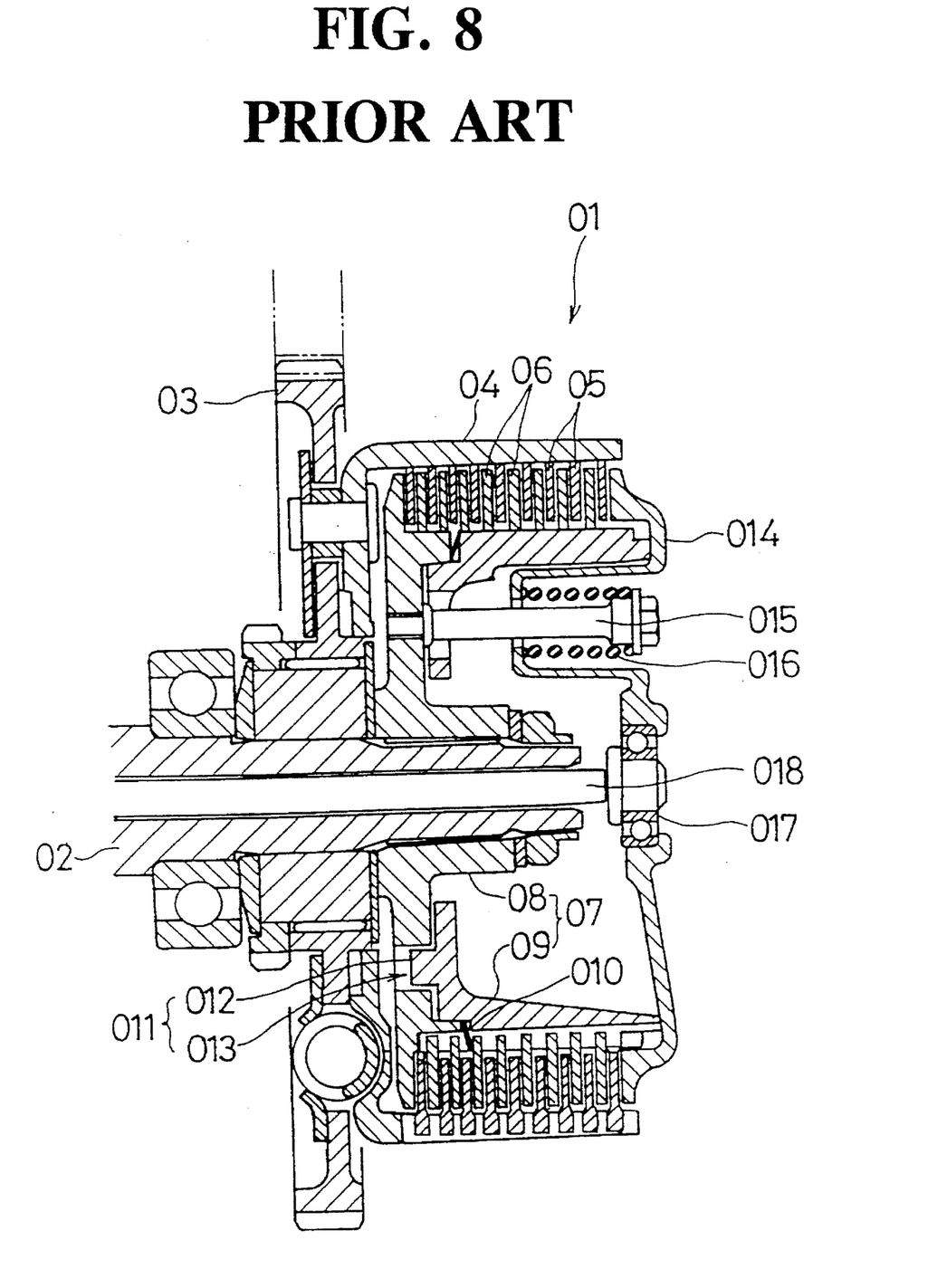
FIG. 8 is a sectional view of a conventional friction clutch.

The example disclosed in Japanese Patent Publication No. Hei 5-73928 is shown in FIG. 8.

A friction clutch 01 of FIG. 8 performs connection and disconnection between a main shaft 02 which is a driven shaft and a driving gear 03 supported coaxially for rotation on the main shaft 02.

A bottomed cylindrical clutch outer member 04 is provided integrally on the driving gear 03, and a plurality of clutch friction plates 05 are supported for sliding movement in an axial direction on an inner periphery of the clutch outer member 04. An equal plural number of clutch plates 06 disposed alternately between the clutch friction plates 05 are provided for sliding movement in an axial direction on a circumference of a clutch hub 07.

The clutch hub 07 is divided in the axial direction into two members of a main hub 08 and a sub hub 09. The main hub 08 on the inner bottom side of the bottomed cylindrical clutch outer member 04 is fitted integrally on the main shaft 02 and corresponds to a clutch center member, and a flange portion thereof is opposed to the clutch friction plates 05 and the clutch plates 06.

The sub hub 09 is fitted for sliding movement in the axial direction on an inner peripheral face of a tubular portion of the main hub 08 and is connected to the main hub 08 by way of a cam mechanism 011.

A cone spring 010 is interposed in a compressed condition between the main hub 08 and the sub hub 09.

A cam mechanism 011 is constituted from a cam pawl 012 and a pawl hole 013 and converts, by the combination of them, a relative rotational displacement between the main hub 08 and the sub hub 09 into a sliding displacement in an axial direction of the sub hub 09.

The sub hub 09 contacts, at a right end thereof, with a pressure plate 014 disposed in such a manner as to close up an opening of the clutch outer member 04, and the pressure plate 014 cooperates with the clutch center member of the main hub 08 to hold the clutch friction plates 05 and the clutch plates 06 therebetween.

A rod 015 provided projectingly on the main hub 08 extends through the pressure plate 014, and a clutch spring 016 in the form of a coil spring is interposed in a compressed condition between an end of the rod 015 and the pressure plate 014.

The pressure plate 014 is supported at the center thereof by a release bearing 017, and a release rod 018 which extends coaxially through the main shaft 02 contacts, at a right end thereof, with the release bearing 017.

The release rod 018 moves in response to operation of a clutch lever or the like.

In the friction clutch 01 of the structure described above, in an ordinary connection condition of the clutch, the pressure plate 014 urges, under the biasing force of the clutch spring 016, the clutch friction plates 05 and the clutch plates 06 toward the main hub 08 to strengthen the frictional engagement between the clutch friction plates 05 and the clutch plates 06.

When the clutch is to be disconnected, the release rod 018 is moved in the rightward direction in FIG. 8 by operation of the clutch lever to move the pressure plate 014 against the clutch spring 016 to increase the distance between the main hub 08 and the pressure plate 014 to cancel the frictionally engaging condition.

Upon acceleration or ordinary running, a torque is applied to the forward side in the direction of rotation from the sub hub 09 to the main hub 08, and the cam mechanism 011 positions the sub hub 09 leftwardly so that the pressure plate 014 urges, under the biasing force of the clutch spring 016, the clutch friction plates 05 and the clutch plates 06 toward the main hub 08 to maintain the frictionally engaging condition.

Upon decelerating running or until the vehicle is stopped, an engine brake operates, and a counter torque is applied to the rear side in the direction of rotation from the main hub 08 on the main shaft 02 side to the sub hub 09. The cam mechanism 011 thus moves the sub hub 09 rightwardly to move the pressure plate 014 away from the main hub 08 to weaken the frictional engagement between the clutch friction plates 05 and the clutch plates 06.

Consequently, a suitable degree of slip is produced between the clutch friction plates 05 and the clutch plates 06 to prevent excessive rotation of the engine and prevent the engine brake from operating excessively.

In this manner, in the conventional friction clutch which includes a countertorque limiter mechanism, the main hub 08 serving as a clutch center member and the pressure plate 014 rotate integrally with each other in the direction of rotation. When a countertorque is applied, the sub hub 09 is rotated relative to the main hub 08. The relative rotation is converted into a displacement in an axial direction by the cam mechanism 011 so that the sub hub 09 pushes the pressure plate 014 in the axial direction to move the pressure plate 014 away from the main hub 08 to weaken the frictional engagement.

Accordingly, an intermediate member such as the sub hub 09 which rotates, when a countertorque is applied, relative to the main hub 08 and converts the relative rotation into a displacement in an axial direction to act upon the pressure plate 014 is required, which makes the construction complicated and requires a high cost.

Since the conventional friction clutch has such a structure that it includes the pressure plate 014 on the opening side of the clutch outer member 04 and the pressure plate 014 is pushed outwardly in order to disconnect the clutch, the release mechanism has a complicated structure wherein the release rod 018 extends through the main shaft 02 and pushes out the pressure plate 014. Even where the conventional friction clutch is applied to an apparatus wherein the release mechanism is provided on the opening side of the clutch outer member 04, the construction wherein the pressure plate 014 is pulled must be employed which makes the structure complicated.

SUMMARY AND OBJECTS OF THE INVENTION

The present invention has been made in view of the foregoing, and it is an object of the present invention to provide an inexpensive friction clutch with a countertorque limiter mechanism of a simplified structure which does not require a special intermediate member for moving a pressure plate in an axial direction when a countertorque is applied.

In order to attain the object described above, according to the present invention, there is provided a friction clutch wherein the distance between a clutch center member on a driven shaft side and a pressure plate, between which an alternate arrangement of clutch friction plates on a driving shaft side and clutch plates on the driven shaft side is disposed, is increased or decreased to disconnect or connect transmission of power between the driving shaft and the driven shaft, constructed such that the clutch center member and the pressure plate are disposed for relative displacement in a direction of rotation. The friction clutch comprises a conversion mechanism for converting a relative displacement in the direction of rotation caused by a countertorque inputted to the friction clutch into a relative displacement in a direction of an axis of rotation to increase the distance between the clutch center member and the pressure plate.

Since the clutch center member and the pressure plate are disposed for relative displacement in the direction of rotation and a relative displacement in the axial direction when a countertorque is inputted, a simple structure wherein a special intermediate member for acting upon the pressure plate is not required, but instead the clutch center member acts directly upon the pressure plate and the cost can be reduced.

Further, even where the clutch center member and the pressure plate are disposed for relative displacement in the direction of rotation, by forming a clutch spring as a truncated conical disk spring, the relative displacement in the direction of rotation does not have an influence on the function of the spring, and the spring can exhibit its original function. By restricting the amount of the relative displacement between the clutch center member and the pressure plate in the direction of rotation by stopper means, the amount of a countertorque to be transmitted from the driven side to the driving side can be controlled to a predetermined amount.

By constructing the stopper means such that a release holder mounting boss provided projectingly on the pressure plate extends through a through-hole of a predetermined shape perforated in the clutch center member, the stopper means can be constructed simply by making use of an existing release mechanism, and simplification and reduction in weight of the structure can be achieved.

By disposing the clutch center member, the pressure plate and the clutch spring in this order in an inward direction from an opening end side of the bottomed cylindrical clutch outer member in the inside of which the clutch friction plates are supported, the structure wherein the pressure plate is pushed from the outside when the clutch is to be disconnected can be obtained. This simplifies the structure, and a countertorque limiter can be adopted readily without modifying a release mechanism in a friction clutch of the type wherein the release mechanism is provided on the clutch cover side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

An embodiment of the present invention shown in FIGS. 1 to 6 will be described below.

Figure 1:
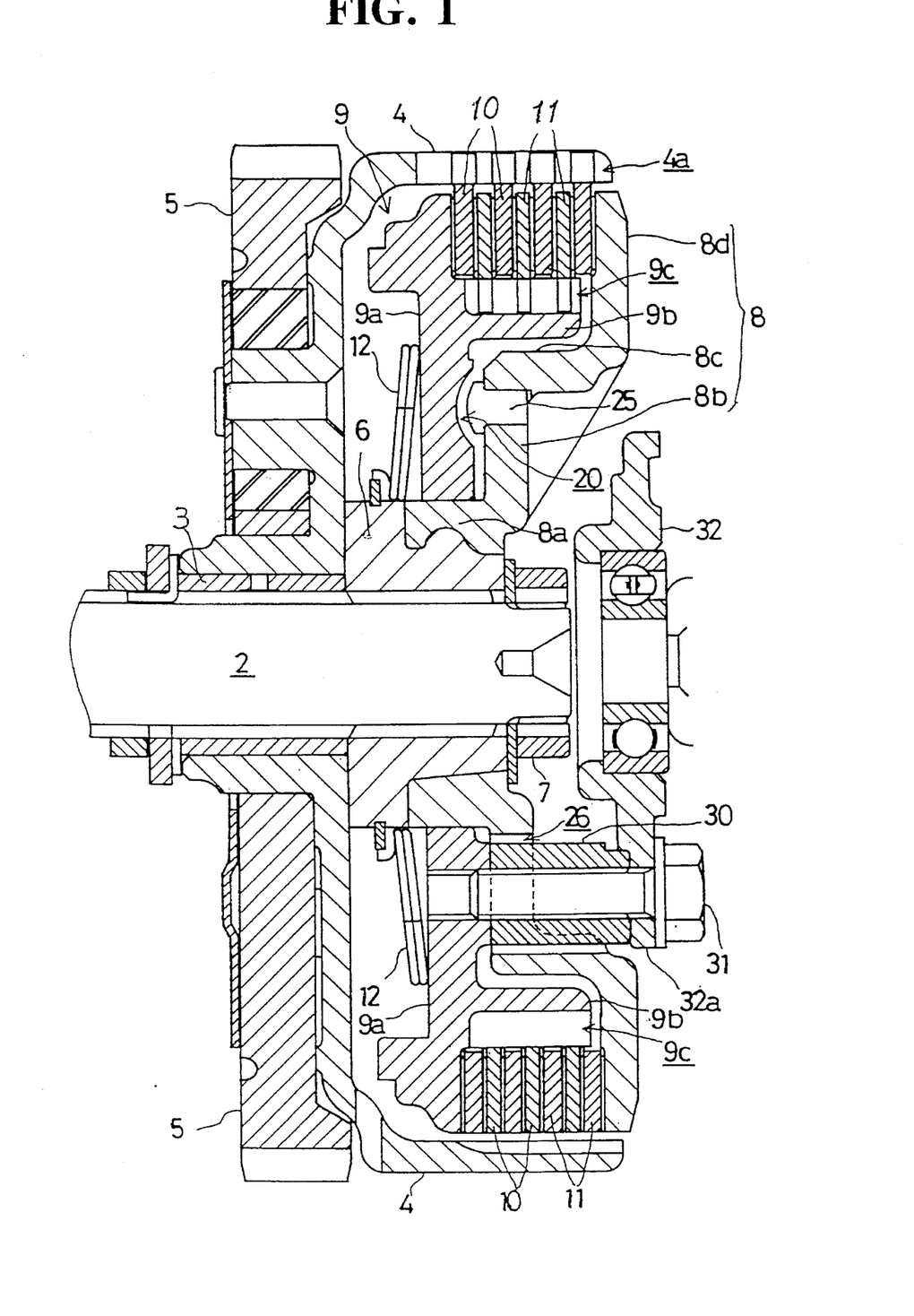
FIG. 1 is a sectional view of a friction clutch according to an embodiment of the present invention.
Figure 2:
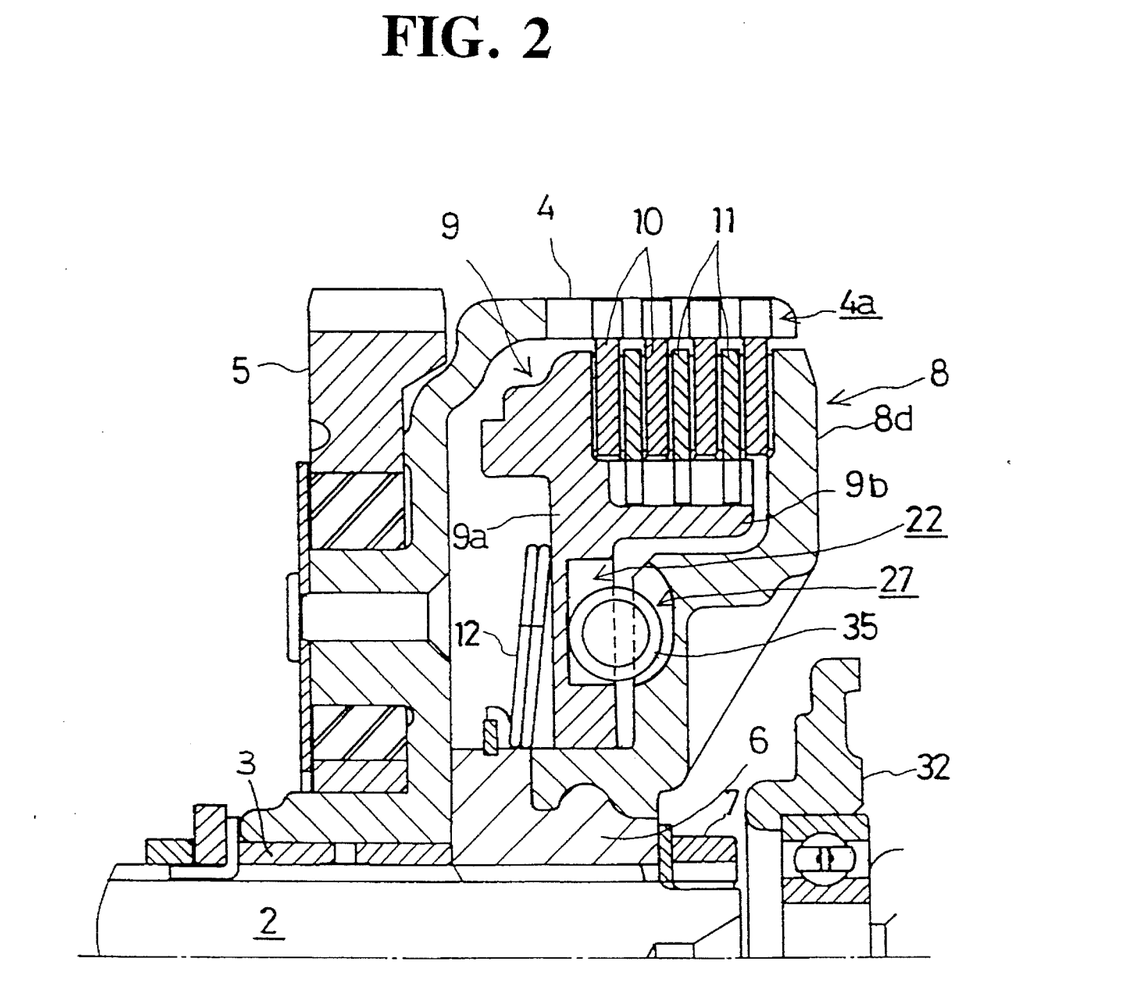
FIG. 2 is a sectional view, partly omitted, of the friction clutch taken along a different sectional plane.

FIG. 1 is a sectional view of a friction clutch of the present embodiment, and FIG. 2 is a sectional view taken along a different sectional plane from that of FIG. 1. A bottomed cylindrical clutch outer member 4 is supported for rotation at a predetermined position on a main shaft 2, which serves as a driven shaft, by way of a bearing 3, and a driving gear 5 is fitted integrally along an outer side face of a bottom portion of the clutch outer member 4.

A hub 6 is fitted by spline fitting on the main shaft 2, which extends into the cylinder of the clutch outer member 4, and is fastened to the main shaft 2 by a nut 7 so as to inhibit movement of the hub 6 but rotate integrally with the main shaft 2. A clutch center member 8 is fitted at a central cylindrical portion 8a thereof on the hub 6.

The clutch center member 8 has an annular disk portion 8b extending in radial directions from the central cylindrical portion 8a and further has a flange portion 8d in the form of an annular disk formed by way of a flattened cylindrical portion 8c. The clutch center member 8 is fitted and supported on the hub 6 in such a manner as to close up the opening of the clutch outer member 4 and rotate integrally with the main shaft 2.

A pressure plate 9 is provided inwardly of the clutch center member 8 in the inside of the cylinder of the clutch outer member 4 and is supported not only for sliding movement in an axial direction but also for limited rotation relative to the clutch center member 8 on the central cylindrical portion 8a of the clutch center member 8 which extends through the pressure plate 9.

The pressure plate 9 has an annular disk portion 9a which has an outer diameter slightly smaller than the inner diameter of the cylinder of the clutch outer member 4 and is opposed to the clutch center member 8. A cylindrical portion 9b extends from an intermediate portion of the disk portion 9a and is formed to extend along an outer peripheral face of the clutch center member 8.

A plurality of clutch friction plates 10 on the clutch outer member 4 side and a plurality of clutch plates 11 on the pressure plate 9 side are disposed alternately in a space between an outer peripheral face of the cylindrical portion 9b of the pressure plate 9 and an inner peripheral face of the cylinder of the clutch outer member 4.

In particular, a plurality of slits 4a directed in the axial direction are formed over a circumferential direction on the inner peripheral face of the cylinder of the clutch outer member 4. Projections on the outer peripheries of the clutch friction plates 10 are engaged with the slits 4a to support the clutch friction plates 10 for sliding movement in the axial direction. Meanwhile, a plurality of grooves 9c directed in the axial direction are formed over a circumferential direction also on an outer peripheral face of the cylindrical portion 9b of the pressure plate 9. Projections on the inner peripheries of the clutch plates 11 are engaged with the grooves 9c to support the clutch plates 11 for sliding movement in the axial direction such that one clutch plate 11 is disposed between adjacent ones of the clutch friction plates 10.

The plurality of clutch friction plates 10 and the plurality of clutch plates 11 are held between the flange portion 8d of the clutch center member 8 and the cylindrical portion 9b of the pressure plate 9.

Accordingly, when the pressure plate 9 moves toward the clutch center member 8 to decrease the distance between them, the clutch friction plates 10 and the clutch plates 11 move toward each other to strengthen the frictional engagement between them. When the pressure plate 9 moves away from the clutch center member 8 to increase the distance between them, the clutch friction plates 10 and the clutch plates 11 move away from each other to weaken the frictional engagement between them.

It is to be noted that the pressure plate 9 is biased in a direction toward the clutch center member 8 (in the rightward direction in FIG. 1) by a truncated conical disk spring 12 serving as a clutch spring which is arrested at a base end thereof to the hub 6.

Figure 3:
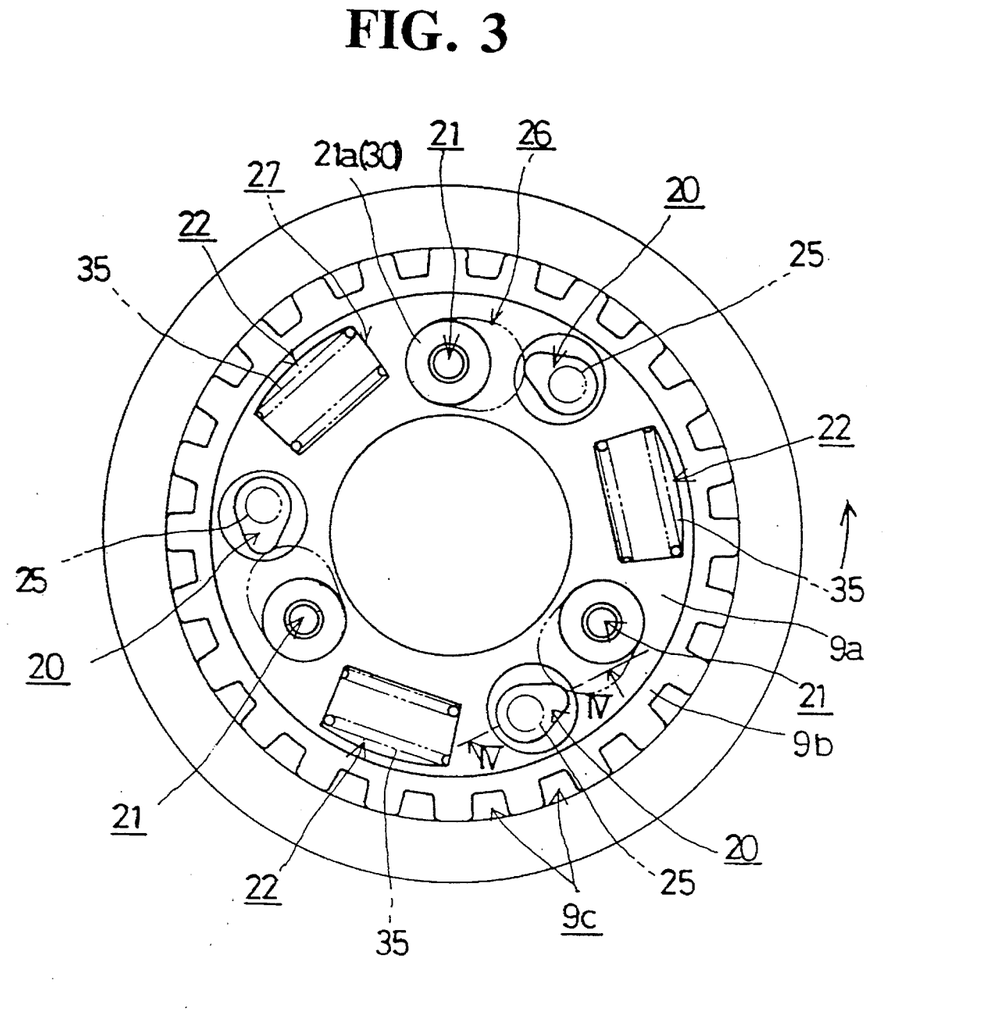
FIG. 3 is a front elevational view of a pressure plate of the embodiment.
Figure 4:
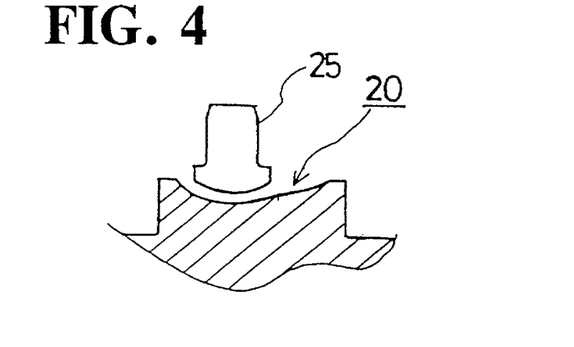
FIG. 4 is a sectional view taken along line IV—IV of FIG. 3.

Three cam recesses 20 are formed on a face of the annular disk portion 9a of the pressure plate 9 facing the clutch center member 8 as shown in FIG. 3. As shown in FIG. 4, the cam recesses 20 are formed such that they are deeper on the rear sides thereon in the direction of rotation and the depth thereof gradually decreases toward the front side.

Further, three threaded holes 21 are formed at equal distances in the annular disk portion 9a of the pressure plate 9 as shown in FIG. 3, and portions around the threaded holes 21 are raised to form mounting stepped portions 21a for release holder supporting bosses 30 which will be hereinafter described.

Furthermore, three elongated grooves 22 are formed also at equal distances on the face of the annular disk portion 9a of the pressure plate 9 facing the clutch center member 8 as shown in FIGS. 2 and 3, and approximately one-half of a return spring 35 can be fitted in each of the elongated grooves 22.

Lifter pins 25 are fitted in the disk portion 8b of the clutch center member 8 facing the pressure plate 9, corresponding to the cam recesses 20 and have head portions accommodated in the cam recesses 20. Elongated apertures 26 elongated in the circumferential direction are formed in the disk portion 8b corresponding to the threaded holes 21. Elongated grooves 27 each having a substantially semicircular section are formed in the disk portion 8b in an opposing relationship to the elongated grooves 22.

The cylindrical release holder supporting bosses 30 are attached to the mounting stepped portions 21a of the pressure plate 9 by bolts 31 secured in the threaded holes and extending through the elongated apertures 26 of the clutch center member 8.

A release holder 32 provided in the proximity of an end of the main shaft 2 is contacted, at three locations of a flange 32a thereof, with ends of the three release holder supporting bosses 30, and the bolts 31 extend through the flange 32a and the release holder supporting bosses 30 to fasten and support the release holder 32.

In particular, the release mechanism is provided on the opening side (clutch cover side) of the bottomed cylindrical clutch outer member 4.

The release holder supporting bosses 30 extending through the elongated apertures 26 of the clutch center member 8 are movable along the elongated apertures 26, and consequently, relative rotation of the pressure plate 9 with respect to the clutch center member 8 is restricted within a range within which the release holder supporting bosses 30 can move within the elongated apertures 26, thereby constituting a stopper mechanism.

The return springs 35 are interposed in a compressed condition in a circumferential direction between the elongated grooves 22 on the pressure plate 9 side and the elongated grooves 27 on the clutch center member 8 and bias the clutch center member 8, when the clutch center member 8 advances in the direction of rotation relative to the pressure plate 9, in the direction to return it to the original position.

Figure 5:
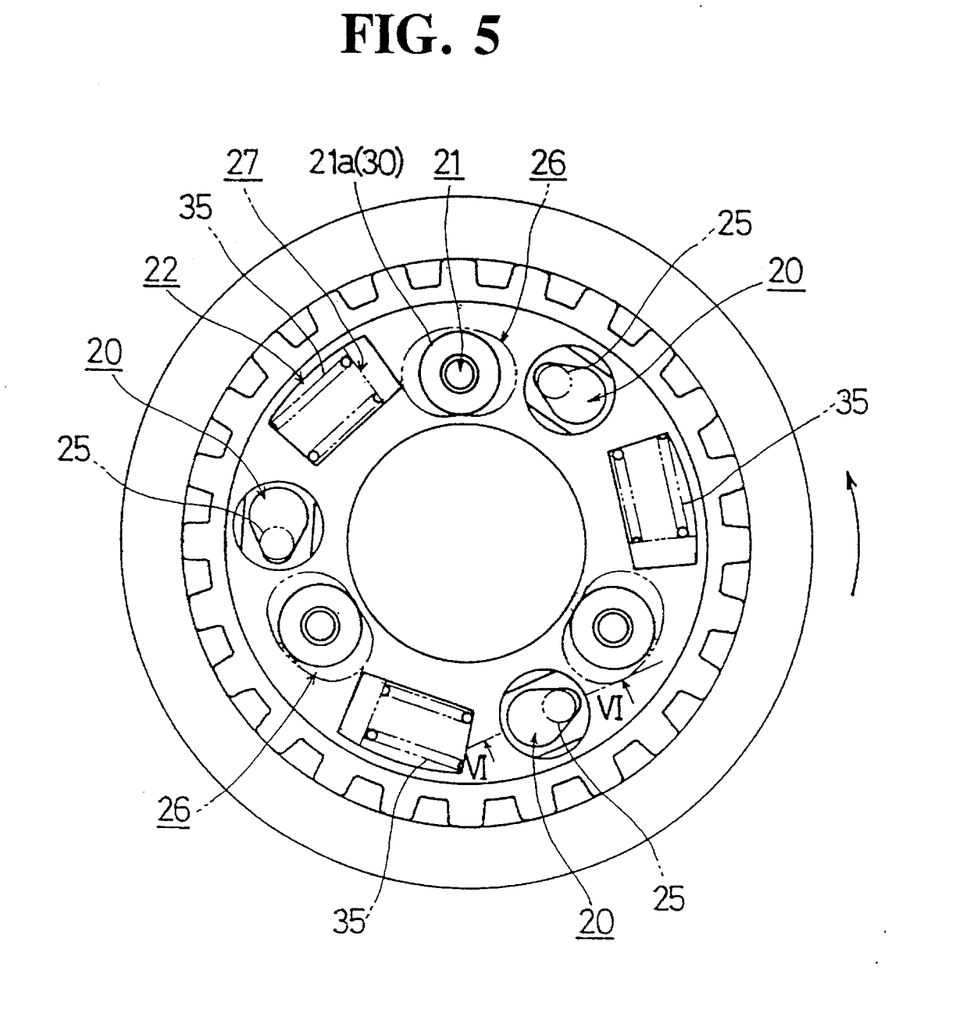
FIG. 5 is a front elevational view of the pressure plate in another condition.

FIGS. 3 and 5 are front elevational views of the pressure plate 9 as viewed from the clutch center member 8 side, and relative positions of the lifter pins 25, the elongated apertures 26 and the elongated grooves 27 on the clutch center member 8 are indicated by alternate long and two short dashes lines. FIG. 3 illustrates a condition upon ordinary running or upon acceleration. FIG. 5 illustrates a condition upon deceleration.

Upon ordinary running, the clutch center member 8 on the driven side is retarded from the driving side, and also the biasing forces of the return springs 35 act so that the mounting stepped portions 21a (release holder supporting bosses 30) precede and are positioned at the trailing end sides in the direction of rotation of the elongated apertures 26 on the clutch center member 8 as shown in FIG. 3 to rotate the clutch center member 8 integrally with the driving side. Also the lifter pins 25 are retarded and positioned at the deepest positions of the cam recesses 20 on the trailing side of the direction of rotation (see FIG. 4).

Accordingly, the pressure plate 9 is at its nearest position to the clutch center member 8, and the distance between the flange portion 8d of the clutch center member 8 and the disk portion 9a of the pressure plate 9 is reduced to strengthen the frictional engagement between the clutch friction plates 10 and the clutch plates 11 to establish a connected clutch condition in which driving of the driving gear 5 is transmitted to the main shaft 2 with a very small amount of power loss.

Figure 6:
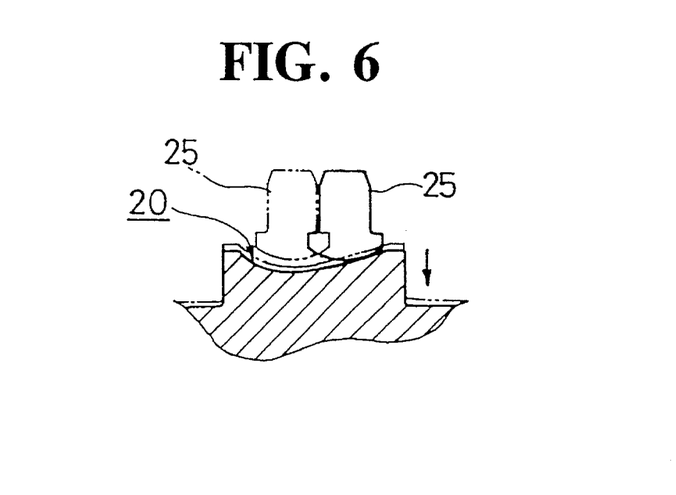
FIG. 6 is a sectional view taken along line VI—VI of FIG. 5.

Upon decelerating running or for a time until the vehicle stops, a countertorque is applied to the clutch by an engine brake. Thereupon, the clutch center member 8 integral with the main shaft 2 as a driven shaft precedes in the direction of rotation to the pressure plate 9 on the engine side so that the elongated apertures 26 on the clutch center member 8 side advance relative to the mounting stepped portions 21a (release holder supporting bosses 30) on the pressure plate 9 side as shown in FIG. 5 against a biasing force of the return springs 35. The lifter pins 25 move to the leading sides of the cam recesses 20 in the direction of rotation such that they push, at the recesses thereof whose depth gradually decreases as shown in FIG. 6, the pressure plate 9 in the axial direction to generate a load against the truncated conical disk spring 12.

Accordingly, the distance between the flange portion 8d of the clutch center member 8 and the disk portion 9a of the pressure plate 9 can be increased to weaken the frictional engagement between the clutch friction plates 10 and the clutch plates 11 to cause the clutch to slip suitably, and application of an excessive countertorque to the driving gear 5 and to the engine side can be reduced thereby to prevent excessive rotation. Furthermore, an excessive effect of the engine brake can be prevented.

When the clutch lever is operated to disconnect the clutch, the release holder 32 is pushed in toward the main shaft 2 side in response to the clutch lever to move the pressure plate 9 in a direction away from the clutch center member 8 against the truncated conical disk spring 12 by way of the release holder supporting bosses 30 thereby to release the frictional engagement between the clutch friction plates 10 and the clutch plates 11 to disconnect the clutch.

Since the clutch spring for biasing the pressure plate 9 toward the clutch center member 8 side is formed as the truncated conical disk spring 12, while the pressure plate 9 rotates relative to the clutch center member 8, the truncated conical disk spring 12 will not fall down or twist and can always exhibit an original function as a truncated conical disk spring.

Since the relative rotation of the pressure plate 9 to the clutch center member 8 is restricted within a range within which the release holder supporting bosses 30 integral with the pressure plate 9 can move within the elongated apertures 26 provided in the clutch center member 8, the amount of a torque to be transmitted from the main shaft 2 side to the driving gear 5 can be restricted to a predetermined amount.

It is to be noted that since the stopper mechanism of the release holder supporting bosses 30 and the elongated apertures 26 is a slight modification to an existing stopper mechanism, it is not necessary to provide a special stopper mechanism, and the number of parts is small and also the weight can be reduced. Furthermore, the stopper mechanism is durable.

Further, since the friction clutch in the present embodiment is constructed such that the clutch center member 8, the pressure plate 9 and the truncated conical disk spring 12 are disposed in this order toward the inner side from the opening end side of the bottomed cylindrical clutch outer member 4, and the pressure plate 9 is biased toward the clutch center member 8 by the truncated conical disk spring 12, while the pressure plate 9 is pushed to the inner side of the clutch outer member 4 by way of the release holder supporting bosses 30 by the release mechanism provided on the clutch cover side, it is simple in structure and easy and inexpensive to manufacture. Further, a countertorque limiter can be adopted readily and conveniently without modifying a release mechanism in a friction clutch of the conventional type wherein the release mechanism is provided on the clutch cover side.

Figure 7:
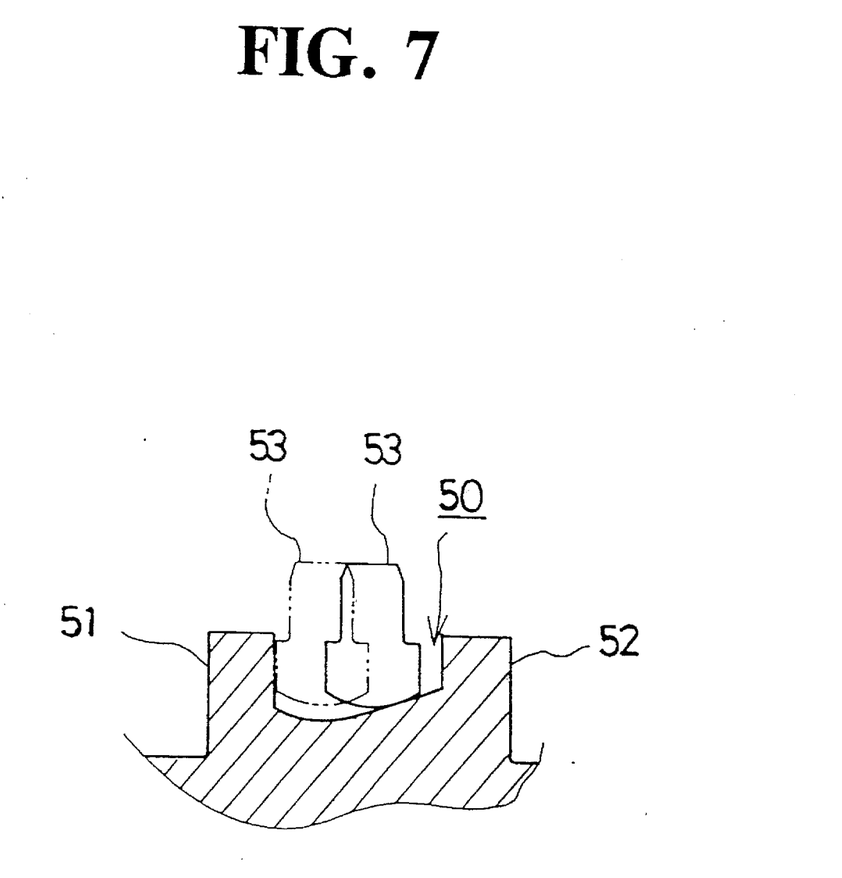
FIG. 7 is a sectional view showing a shape of a cam recess of another embodiment.

While, in the embodiment described above, the relative rotation of the pressure plate 9 to the clutch center member 8 is restricted by the stopper mechanism of the release holder supporting bosses 30 and the elongated apertures 26, a pair of stoppers 51 and 52 may be formed to project at front and rear positions in the direction of rotation of cam recesses 50 provided on a pressure plate such that lifter pins 53 on the clutch center member side are positioned between the stoppers 51 and 52 so as to restrict movement of the lifter pins 53 as seen in FIG. 7.

Further, while the lifter pins 25 are fixedly mounted on the clutch center member 8 and the head portions thereof are accommodated in the cam recesses 20 on the pressure plate 9 side, the surface of the clutch center member may be raised to form projections in place of the lifter pins 25.

According to the present invention, since a clutch center member and a pressure plate are disposed for relative displacement in the direction of rotation and a relative displacement in the axial direction when a countertorque is inputted, a simple structure wherein a special intermediate member for acting upon the pressure plate is not required, but instead the clutch center member acts directly upon the pressure plate and also the cost can be reduced.

By employing a truncated conical disk spring as a clutch spring, the relative rotational displacement between the clutch center member and the pressure plate does not have an influence on the function of the spring, and the spring can exhibit its original function.

By restricting the amount of the relative displacement between the clutch center member and the pressure plate in the direction of rotation by stopper means, the amount of a countertorque to be transmitted from the driven side to the driving side can be controlled to a predetermined amount.

By constructing the stopper means such that a release holder mounting boss provided projectingly on the pressure plate extends through a through-hole of a predetermined shape formed in the clutch center member, the stopper means can be constructed simply by making use of an existing release mechanism, and simplification and reduction in weight of the structure can be achieved.

By disposing the clutch center member, the pressure plate and the clutch spring in this order in an inward direction from an opening end side of a bottomed cylindrical clutch outer member in the inside of which the clutch friction plates are supported, the structure wherein the pressure plate is pushed from the outside when the clutch is to be disconnected can be obtained. Consequently, the friction clutch is simple in structure and easy and inexpensive to manufacture. Further, a countertorque limiter can be adopted readily and conveniently without modifying a release mechanism in a friction clutch of the type wherein the release mechanism is provided on the clutch cover side.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A friction clutch wherein a distance between a clutch center member on a driven shaft side and a pressure plate, between which an alternate arrangement of clutch friction plates on a driving shaft side and clutch plates on said driven shaft side is disposed, is increased or decreased, while said clutch center member and said pressure plate are normally biased in a direction to decrease the distance therebetween by a clutch spring, to disconnect or connect transmission of power between said driving shaft and said driven shaft, wherein said clutch center member and said pressure plate are disposed for relative displacement in a direction of rotation, said friction clutch comprising:

a conversion mechanism for converting a relative displacement in the direction of rotation between said clutch center member and said pressure plate caused by a countertorque inputted to said friction clutch into a relative displacement in a direction of an axis of rotation to increase the distance between said clutch center member and said pressure plate, wherein said clutch friction plates are supported inside of a bottomed cylindrical clutch outer member, and wherein said clutch center member, said pressure plate and said clutch spring are disposed in this order proceeding in an inward direction from an opening end side of said bottomed cylindrical clutch outer member.

2. The friction clutch according to claim 1, wherein said clutch spring comprises a truncated conical disk spring.

3. The friction clutch according to claim 1, further comprising stopper means for restricting the relative displacement between said clutch center member and said pressure plate in the direction of rotation to a predetermined displacement amount.

4. The friction clutch according to claim 3, wherein said stopper means includes a structure such that a release holder mounting boss provided projectingly on said pressure plate extends through a through-hole of a predetermined shape perforated in said clutch center member.

5. A friction clutch comprising:

a clutch center member attached to a driven side of said friction clutch;

a pressure plate mounted adjacent to said clutch center member;

a countertorque limiter mechanism for preventing a countertorque from said driven side from excessively rotating a driving side of said friction clutch, said countertorque limiter mechanism comprising converting means for converting relative rotational displacement between said pressure plate and said clutch center member into relative axial displacement between said pressure plate and said clutch center member; and biasing means located between said pressure plate and said clutch center member for opposing said relative rotational displacement between said pressure plate and said clutch center member.

6. The friction clutch according to claim 5, wherein said converting means comprises a camming mechanism.

7. The friction clutch according to claim 6, wherein said camming mechanism comprises at least one inclined camming surface on one of said pressure plate and said clutch center member.

8. The friction clutch according to claim 7, wherein said camming mechanism further comprises at least one projection on the other of said pressure plate and said clutch center member for cooperating with a complementary inclined camming surface.

9. The friction clutch according to claim 8, wherein three inclined camming surfaces are provided at substantially equally spaced-apart locations on said pressure plate, and three complementary projections are provided on said clutch center member, whereby a countertorque applied to said driven side of said friction clutch produces said relative rotational displacement to thereby cause said projections to move along said inclined camming surfaces to increase a separation distance between said pressure plate and said clutch center member.

10. The friction clutch according to claim 5, further comprising a cylindrical clutch outer member, said cylindrical clutch outer member having a plurality of friction plates attached thereto, said pressure plate having a plurality of clutch plates attached thereto, said friction plates and said clutch plates being arranged in an alternating fashion.

11. The friction clutch according to claim 5, further comprising a truncated conical spring member for biasing said pressure plate toward said clutch center member.

12. The friction clutch according to claim 11, wherein said pressure plate is substantially located between said spring member and said clutch center member.

13. The friction clutch according to claim 5, further comprising stop means for limiting said relative rotational displacement between said pressure plate and said clutch center member.

14. The friction clutch according to claim 13, wherein said stop means comprises at least one elongated aperture in said clutch center member, and at least one projection on said pressure plate movable within said elongated aperture.

15. The friction clutch according to claim 5, wherein said biasing means comprises a plurality of helical springs.

16. A friction clutch comprising:

a cylindrical clutch outer member, said cylindrical clutch outer member having a plurality of friction plates attached thereto;

a pressure plate mounted adjacent to said cylindrical clutch outer member, said pressure plate having a plurality of clutch plates attached thereto, said friction plates and said clutch plates being arranged in an alternating fashion;

a clutch center member attached to a driven side of said friction clutch;

a truncated conical spring member for biasing said pressure plate toward said clutch center member, said pressure plate being substantially located between said spring member and said clutch center member; and a countertorque limiter mechanism for preventing a countertorque from said driven side from excessively rotating a driving side of said friction clutch, said countertorque limiter mechanism comprising camming means for converting relative rotational displacement between said pressure plate and said clutch center member into relative axial displacement between said pressure plate and said clutch center member, said camming means comprising a plurality of inclined camming surfaces at substantially equally spaced-apart locations on said pressure plate, and an equal number of complementary projections on said clutch center member, whereby a countertorque applied to said driven side of said friction clutch produces said relative rotational displacement to thereby cause said projections to move along said inclined camming surfaces to increase a separation distance between said pressure plate and said clutch center member.

17. A friction clutch wherein a distance between a clutch center member on a driven shaft side and a pressure plate, between which an alternate arrangement of clutch friction plates on a driving shaft side and clutch plates on said driven shaft side is disposed, is increased or decreased, while said clutch center member and said pressure plate are normally biased in a direction to decrease the distance therebetween by a clutch spring, to disconnect or connect transmission of power between said driving shaft and said driven shaft, wherein said clutch center member and said pressure plate are disposed for relative displacement in a direction of rotation, said friction clutch comprising:

a conversion mechanism for converting a relative displacement in the direction of rotation between said clutch center member and said pressure plate caused by a countertorque inputted to said friction clutch into a relative displacement in a direction of an axis of rotation to increase the distance between said clutch center member and said pressure plate; and stopper means for restricting the relative displacement between said clutch center member and said pressure plate in the direction of rotation to a predetermined displacement amount, said stopper means including a structure such that a release holder mounting boss provided projectingly on said pressure plate extends through a through-hole of a predetermined shape perforated in said clutch center member.

18. A friction clutch comprising:

a clutch center member attached to a driven side of said friction clutch;

a pressure plate mounted adjacent to said clutch center member; and a countertorque limiter mechanism for preventing a countertorque from said driven side from excessively rotating a driving side of said friction clutch, said countertorque limiter mechanism comprising converting means for converting relative rotational displacement between said pressure plate and said clutch center member into relative axial displacement between said pressure plate and said clutch center member, said converting means including a camming mechanism having at least one inclined camming surface on one of said pressure plate and said clutch center member, and at least one projection on the other of said pressure plate and said clutch center member for cooperating with a complementary inclined camming surface.

19. A friction clutch comprising:

a clutch center member attached to a driven side of said friction clutch;

a pressure plate mounted adjacent to said clutch center member;

a countertorque limiter mechanism for preventing a countertorque from said driven side from excessively rotating a driving side of said friction clutch, said countertorque limiter mechanism comprising converting means for converting relative rotational displacement between said pressure plate and said clutch center member into relative axial displacement between said pressure plate and said clutch center member; and a cylindrical clutch outer member, said cylindrical clutch outer member having a plurality of friction plates attached thereto, said pressure plate having a plurality of clutch plates attached thereto, said friction plates and said clutch plates being arranged in an alternating fashion.

20. A friction clutch comprising:

a clutch center member attached to a driven side of said friction clutch;

a pressure plate mounted adjacent to said clutch center member;

a countertorque limiter mechanism for preventing a countertorque from said driven side from excessively rotating a driving side of said friction clutch, said countertorque limiter mechanism comprising converting means for converting relative rotational displacement between said pressure plate and said clutch center member into relative axial displacement between said pressure plate and said clutch center member; and stop means for limiting said relative rotational displacement between said pressure plate and said clutch center member, said stop means including at least one elongated aperture in said clutch center member, and at least one projection on said pressure plate movable within said elongated aperture.

* * * * *